Patented June 6, 1939

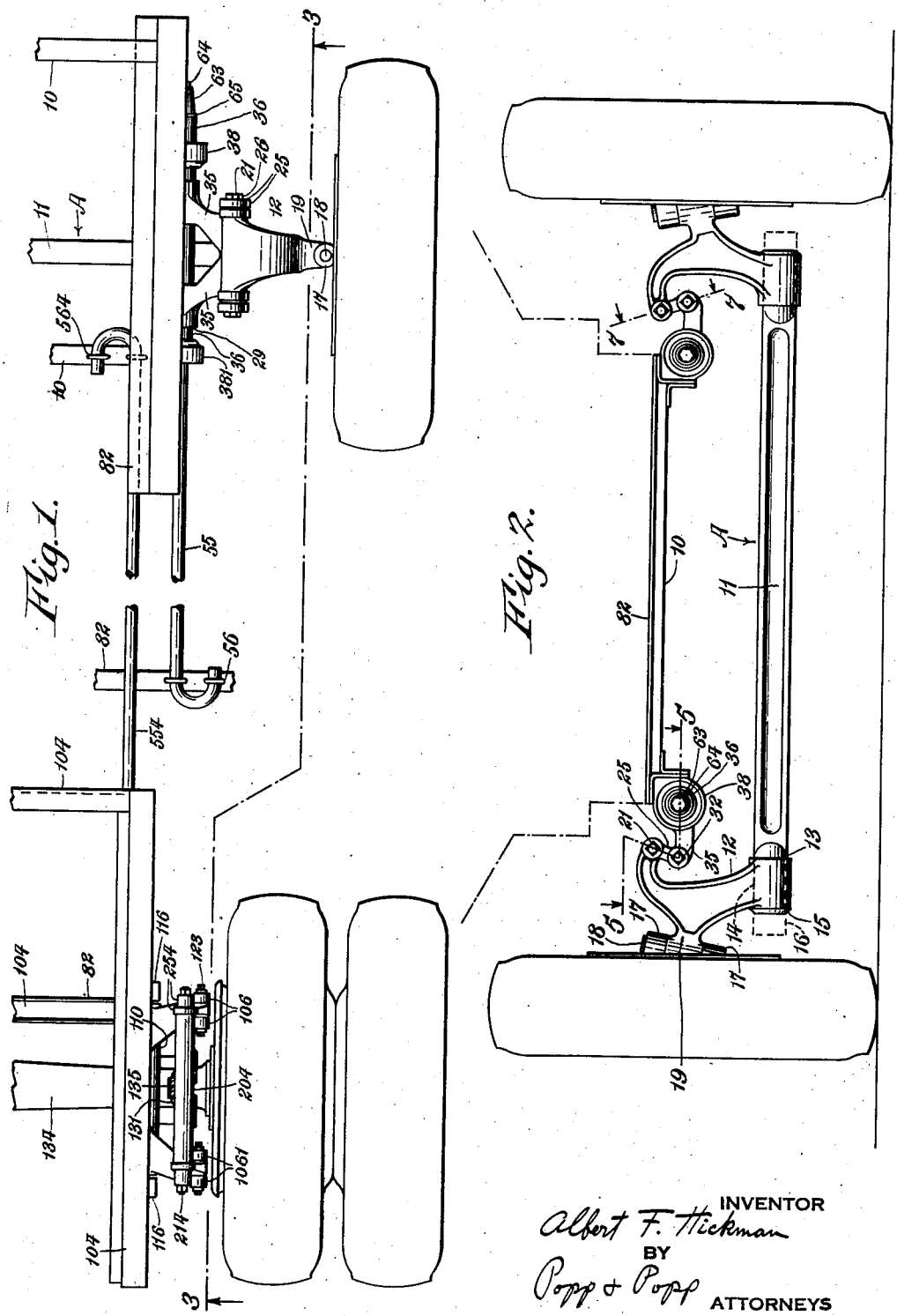

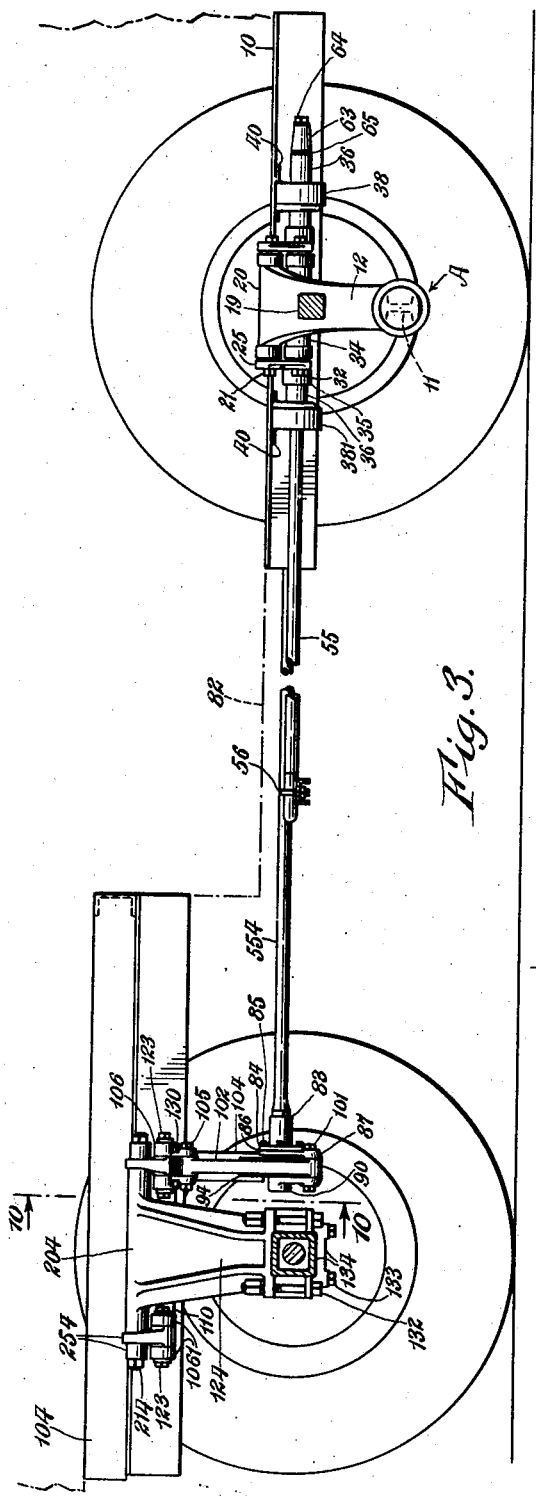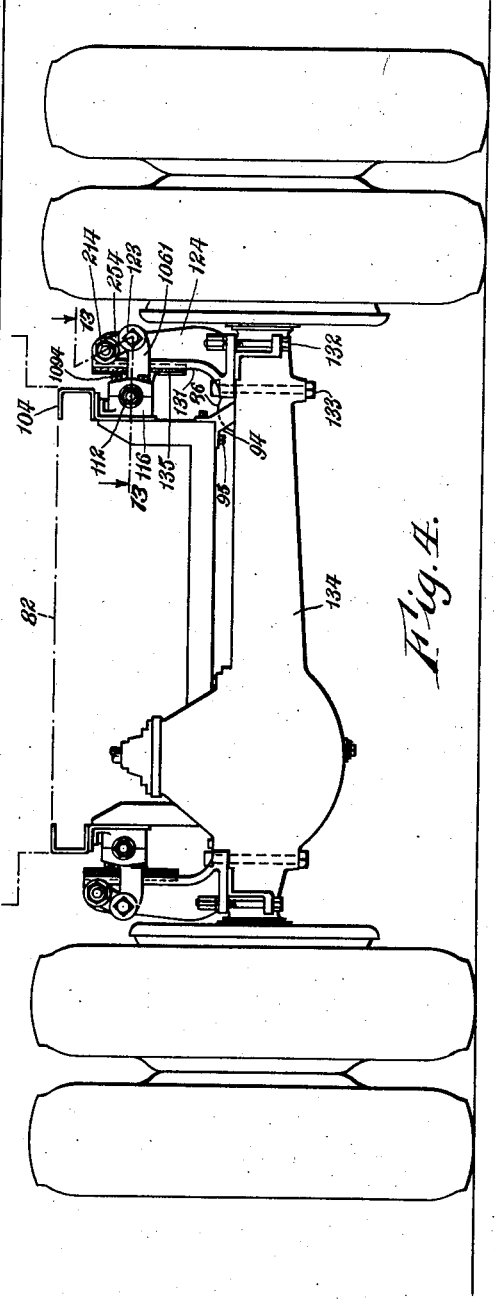

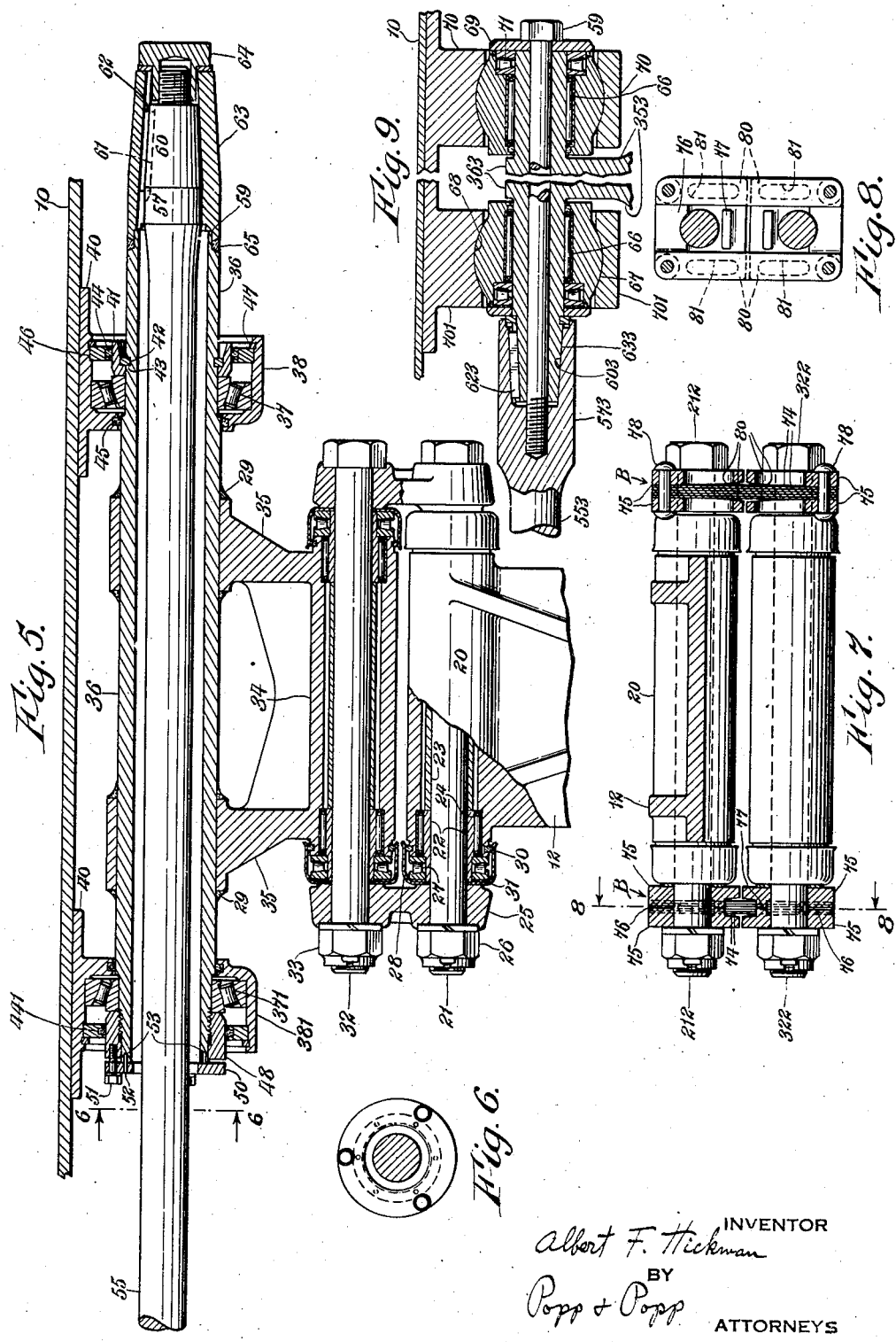

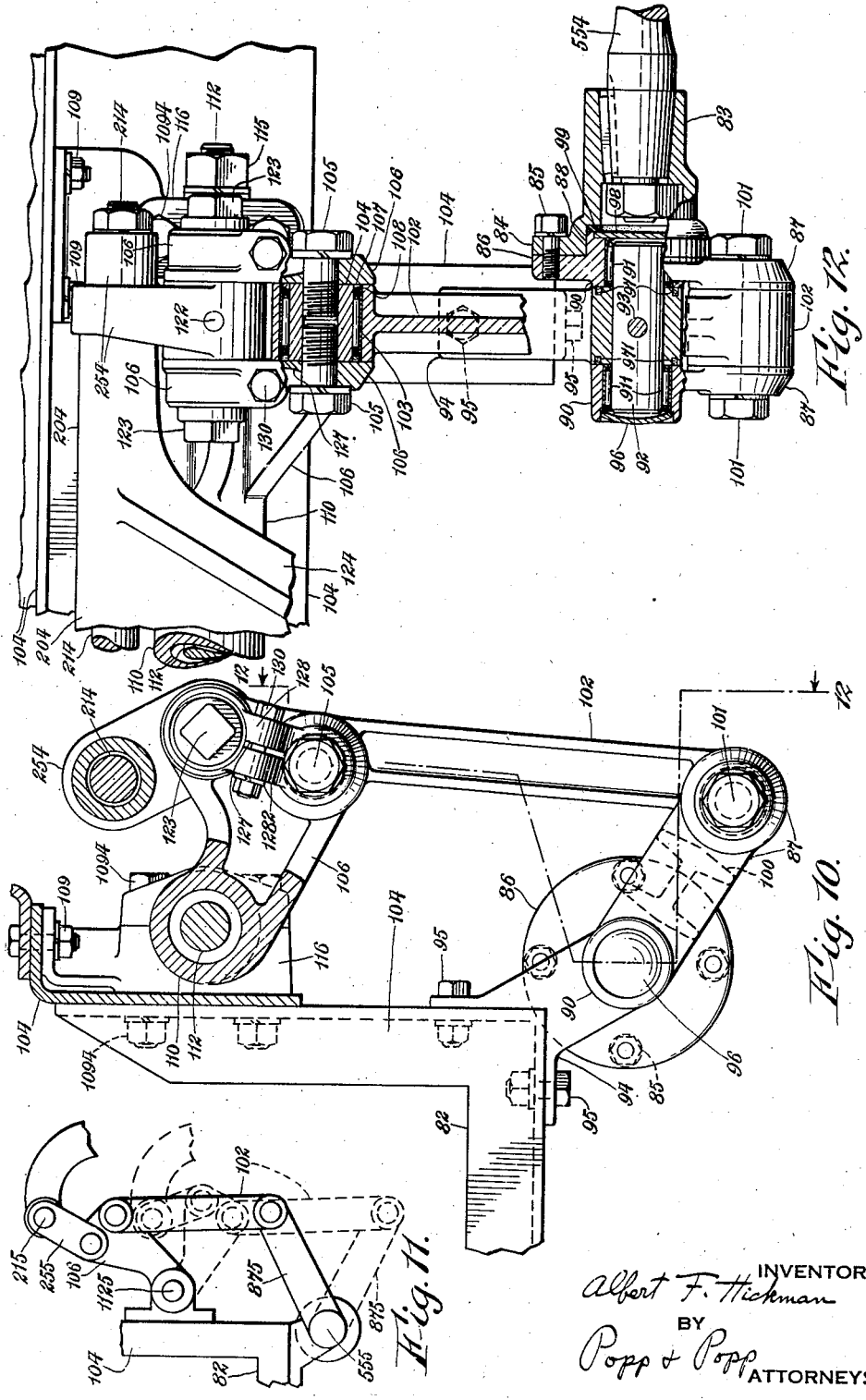

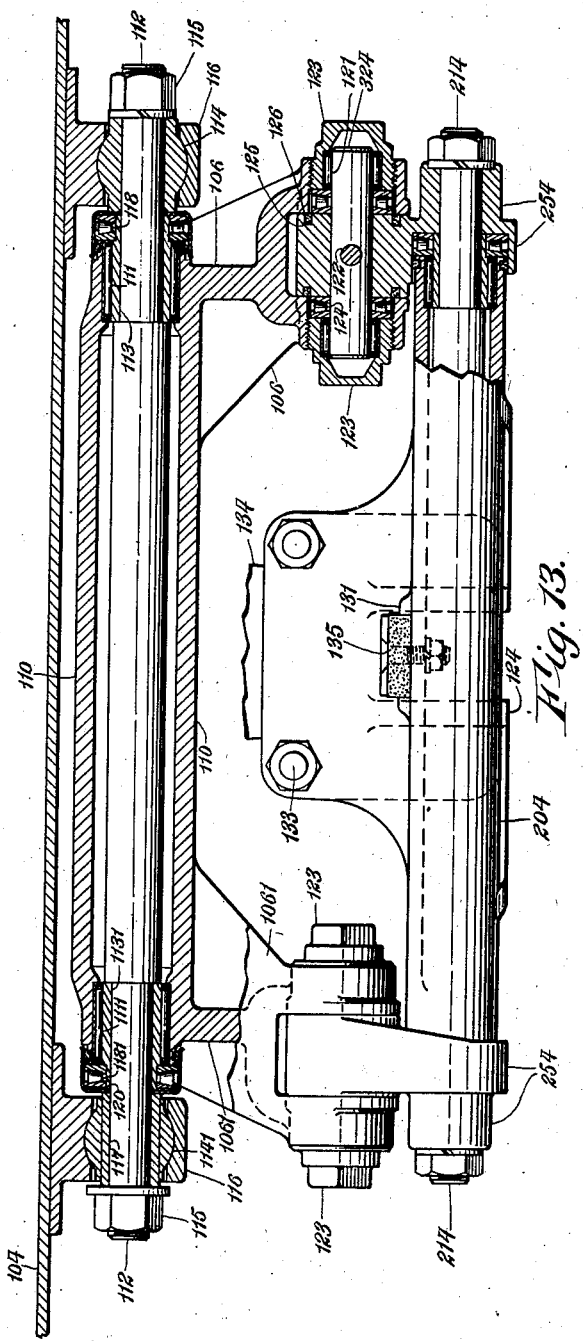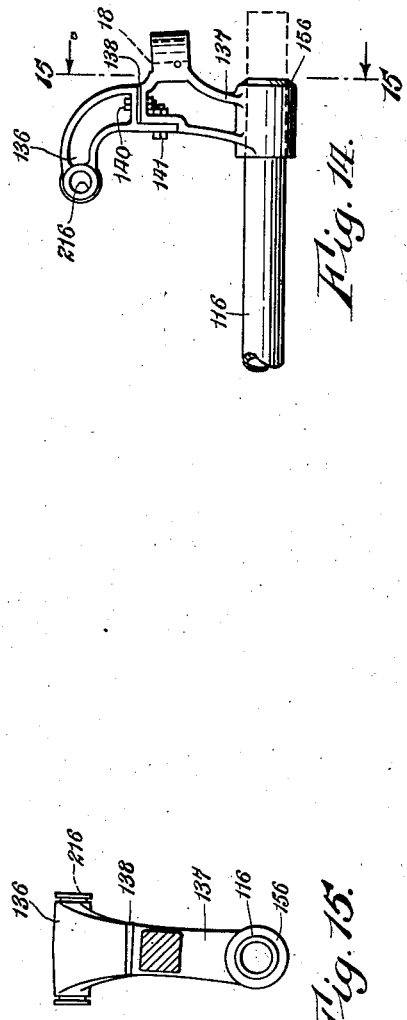

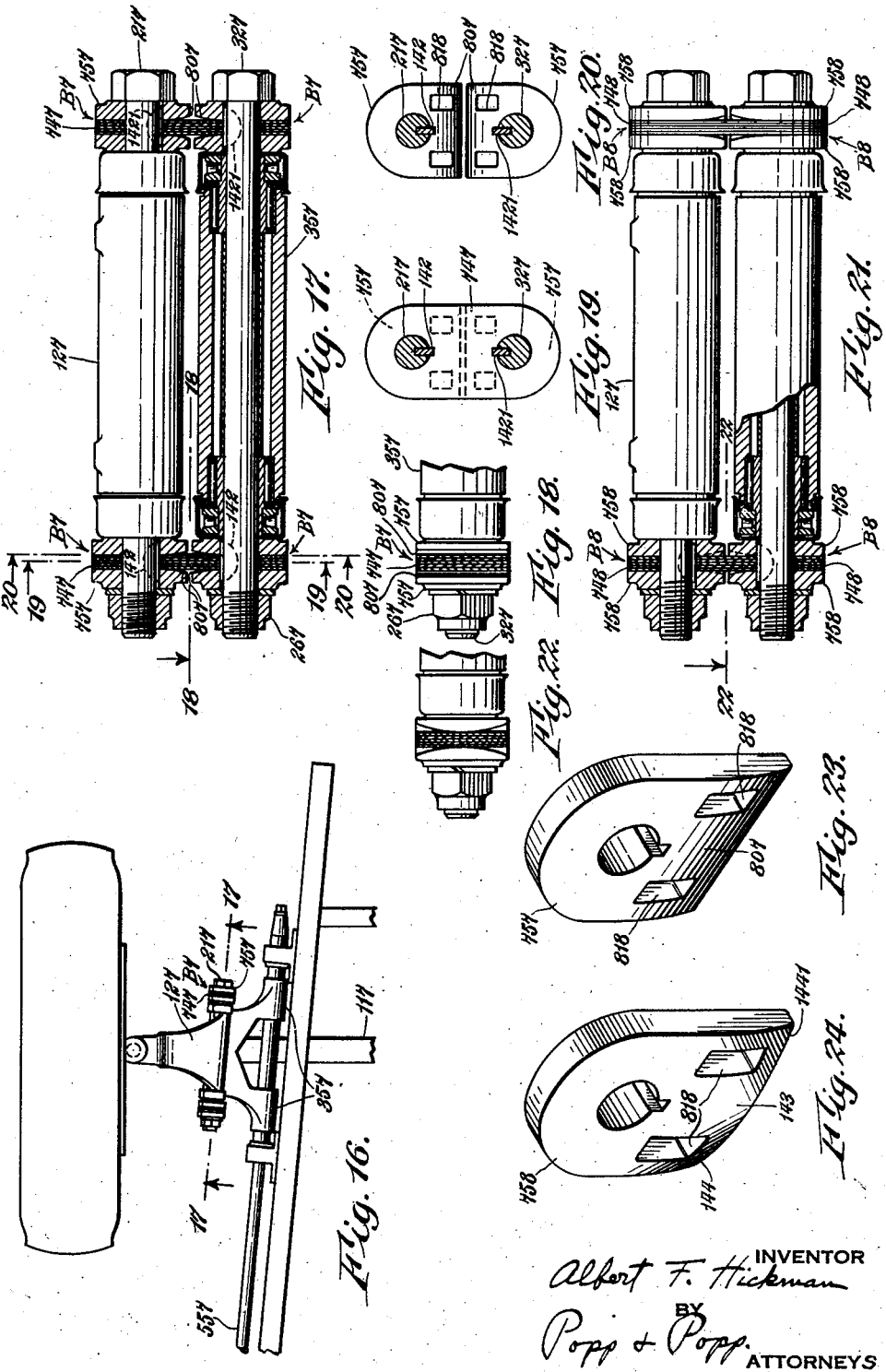

2,160,862

UNITED STATES PATENT OFFICE 2,160,862

VEHICLE SUSPENSION

Albert F. Hickman, Eden, N. Y., assignor to Hickman Pneumatic Seat Co., Inc., Eden, N. Y., a corporation of New York Application June 17, 1936, Serial No. 85,726

12 Claims. (Cl. 267—57)

This invention relates to a vehicle suspension, and more particularly to a vehicle spring suspension of the torsion rod type in which each end of each axle is provided with an individual torsion rod disposed longitudinally of the vehicle.

The objects of this invention are:
1. To provide a frictionless, metallic kick shackle which will provide a geometric increase of resistance to axle movement;
2. To provide a linkage arrangement between an axle and the vehicle frame which will most effectively resist axle roll;
3. To provide the most effective and inexpensive type of adjustable bearings for a linkage of this type;
4. To provide a connection between a torsion rod and its crank arm which will permit of the use of a torsion rod of maximum length and yet be simple and inexpensive in construction;
5. To enable very considerably elevated axle pivots to be effectively employed even though the vehicle frame is very low;
6. To provide for an increase of resilient resistance to vertical axle movement of any desired displacement-resistance characteristics;
7. To provide a resilient but nevertheless positive means of limiting axle movement in a direction parallel to its length and transverse of the vehicle;
8. To provide a connection between an axle and the frame which will permit of adjusting the caster of the axle;
9. To provide an axle in which the component parts thereof can be welded together without weakening the axle, even though some of the parts are heat treated.

Numerous other objects of the invention and practical solutions thereof are disclosed in the herein specification and in the accompanying drawings.

This invention is a continuation in part of the following patent applications: Ser. No. 637,444, filed October 12, 1932; Ser. No. 696,803, filed November 6, 1933; Ser. No. 713,161, filed February 27, 1934; Ser. No. 752,488, filed November 10, 1934; and Ser. No. 61,200, filed January 28, 1936.

In the accompanying drawings:

Fig. 1 is a fragmentary, diminutive, plan view of a vehicle equipped with my improved spring suspension.

Fig. 2 is a diminutive, front end elevation thereof.

Fig. 3 is a fragmentary, diminutive, vertical, longitudinal section of the spring suspension taken on line 3—3, Fig. 1.

Fig. 4 is a diminutive, rear end elevation of the spring suspension.

Fig. 5 is a fragmentary, distended and substantially horizontal section through the right, front axle suspension, taken on line 5—5, Fig. 2.

Fig. 6 is a vertical transverse section through the front axle torsion rod, taken on line 6—6, Fig. 5.

Fig. 7 is a fragmentary, vertical, section of the kick shackle at the left front end of the front axle suspension, taken on line 7—7, Fig. 2.

Fig. 8 is a vertical, transverse section thereof, taken on line 8—8, Fig. 7.

Fig. 9 is a fragmentary, distended and substantially horizontal section through a right front axle suspension similar to the distended section of Fig. 5, but showing a modified torsion rod and rock lever construction.

Fig. 10 is a fragmentary, vertical, transverse section of the linkage of the rear axle suspension, taken on line 10—10, Fig. 3.

Fig. 11 is a diagrammatic view of a linkage similar to but different from that shown in Fig. 10.

Fig. 12 is a fragmentary, vertical, longitudinal section of said rear linkage of the vehicle, taken on line 12—12, Fig. 10.

Fig. 13 is a fragmentary, distended, and substantially horizontal section thereof, taken on line 13—13, Fig. 4.

Fig. 14 is a fragmentary, front elevation of a modified form of front axle.

Fig. 15 is a vertical, transverse section of said modified axle, taken on line 15—15, Fig. 14.

Fig. 16 is a fragmentary, diminutive, top plan of a torsion rod arrangement disposed obliquely with reference to the vertical longitudinal, medial plane of the vehicle.

Fig. 17 is a vertical, longitudinal section thereof, taken on line 17—17, Fig. 16.

Fig. 18 is a fragmentary, horizontal section through one of the torque, kick shackles, taken on line 18—18, Fig. 17.

Figs. 19 and 20 are vertical sections through said torque, kick shackle.

Fig. 21 is a vertical, longitudinal section similar to Fig. 17 but showing plain torque shackles instead of torque kick shackles.

Fig. 22 is a fragmentary, horizontal section thereof, taken on line 22—22, Fig. 21.

Fig. 23 is a perspective view of one of the torque, kick-shackle, controlling blocks.

Fig. 24 is a perspective view of one of the torque, shackle, controlling blocks.

Similar characters of reference indicate like parts in the several figures of the drawings.

For a detailed analysis of the reasons underlying the basic construction of the present invention, reference may be had to my patent application for Vehicle spring suspension, Ser. No. 713,161; Canadian patent for Vehicle spring suspension, No. 336,971 issued November 7, 1933; and and my original "gravity" spring patent for Vehicle spring and shock absorber suspension, No. 1,892,305, issued December 27, 1932.

*Front end*

In the present invention, the body of the vehicle is structurally the real load carrying frame of the vehicle, but for the purpose of explanation it is deemed more convenient to speak of the frame of the vehicle as consisting of a front frame section 10 and a rear frame section 104. Arranged transversely beneath the front vehicle frame section 10 is a front axle A consisting of an axle bar 11 and a pair of upstanding axle posts 12.

The fabrication of this front axle A is as follows: The outer ends 13 of the axle bar 11 are of cylindrical form, and each axle post 12 is horizontally and transversely bored out to form a cylindrical opening 14 which receives the companion cylindrical end of said axle bar 11, preferably with a press fit. After placing the axle bar 11 in its proper location with reference to its two axle posts 12, the latter are secured to said axle bar by welding at 15. This welding does not injure the strength of these members because the location of said welding is so far removed from those portions of the members where great strength is required that the effective strength of said members is not deleteriously affected by the heat resulting from the welding operation. This is true even if one or both of the members had received heat treatment prior to the welding operation. After the welding at 15 has been completed any surplus length 16 of the axle is cut off flush with the outer edge of said welding 15. This enables standard axle posts 12 to be used for any length of axle bar 11. A conventional front wheel knuckle 17 is pivoted on spindles 18 to each axle arm 19 in the usual and well known manner.

Located preferably integrally in the upper end of each axle post 12 is a longitudinal and relatively long axle pivot sleeve 20 (see Figs. 5, 7, 1 and 2) in the bore of which is disposed a longitudinal, and relatively long axle pivot 21 having the shape of an ordinary bolt. Encircling the ends of said axle pivot 21 is a pair of hardened and ground, inner, needle-bearing races 22 which are held apart in spaced relation from each other by a spacing collar 23. Arranged between each of said needle-bearing races 22 and the adjacent outer portion of the bore of the crank pin sleeve 20 is a needle bearing 24 which is preferably contained within a suitable cage, as shown, the latter serving not only as a container to facilitate assembly, but also serving to form a hardened and ground outer race for the rollers of the needle bearing.

We will confine our attention, for the moment, to the right end of the front axle.

Arranged at opposite ends of the axle pivot sleeve 20 is a pair of shackles 25 through which the axle pivot 21 passes. Said axle pivot 21 is firmly clamped to each of said shackles 25, and thus, in effect, firmly clamping said shackles together by drawing up the nut 26 of said axle pivot, thereby pressing the upper ends of said shackles 25 inwardly against the outer ends of the inner, needle bearing races 22 and the latter, in turn, pressing against the outer ends of the spacing collar 23. This clamping of the shackles 25 together is deemed to be a very desirable feature from the viewpoint of wear, noise of operation, etc. It is to be borne in mind, however, that this feature is not vital, and that the spring suspension will operate quite satisfactorily even though the axle pivot 21 should become loosened. This is because of the fact that each end of the axle A is constrained to move in a plane which is perpendicular and transverse of the vehicle (except for the small horizontal movement resulting from kick shackle action, to be later explained). This means that each end of the axle prevents the shackles 25 at the other end of the axle from moving relatively to each other.

The outer end of each inner, needle-bearing race 22 is turned down to receive a tapered-roller, thrust bearing 27. Disposed outwardly of each of said thrust bearings, and against the outer end of the companion, inner, needle-bearing race 22, is a cup-shaped lubricant retainer 28 whose inner, cylindrical portion rotates upon a felt sealing ring 30 suitably disposed in an annular groove which is formed in the adjacent peripheral surface of the axle pivot sleeve 20.

To avoid the need of unduly fine working tolerances in the fabrication of the component parts of this part of the spring suspension, means are provided for adjusting the thrust bearings 27 after the parts have been assembled. This adjustment is effected by an annular shim or adjusting washer 31 which rides on the outer end of the inner, needle-bearing race 22 and is chosen of the proper measured thickness to provide the proper spacing between the outer face of its companion thrust bearing 27 and the vertical inner face of the lubricant retainer 28. Ordinarily, no adjusting washer is required between the other thrust bearing 27 and the other lubricant retainer 28, but one may be inserted if deemed desirable. It it to be noted, in this connection, that a small amount of longitudinal shifting of the needle bearings 24 is not objectionable and that, therefore, such a shifting can be kept within necessary dimensional limits without requiring unduly fine tolerances in the fabrication of the component parts. Hence no longitudinal adjustment of the needle bearings 24 is required.

The lower ends of the shackles 25 are clamped to each other and to a crank pin 32 by drawing up the nut 33 of said crank pin, in a manner identical with that just described relative to the axle pivot 21. In a similar manner, also, the crank pin 32 is journaled in a crank pin sleeve 34 which is preferably formed longitudinally and integrally at the outer ends of a pair of rock levers 35 whose inner ends are secured by welding, at 29, to a longitudinal rock sleeve 36.

In Fig. 5, the crank pin 32 is shown as being located at what appears to be the upper end of the shackles 25, but this is only because this Fig. 5 and also Fig. 9 are "distended" and substantially horizontal sections so as to show, in one drawing, the complete linkage between the axle A and front frame section 10.

The opposite ends of the said rock sleeve 36 are journaled on bearings 37, 371 in bearing housings 38, 381 which latter are provided with suitable flanges 40 to enable them to be conveniently secured, by bolting or otherwise, to the front frame section 10. These bearings are of the self-aligning type so as to prevent any binding of said bearings as a consequence of misalignment or frame distortion, and are of the type which carry both radial and axial loads. The front face of the inner bearing race of the front bearing 37 bears against the rear face of a thrust collar 41 which is bored out at its front end to embrace a split thrust ring or snap ring 42. The latter is restrained against forward movement relatively to the rock sleeve 36 by being snapped into an annular retaining groove 43 formed in the annular surface of the front end of the rock sleeve 36. Escape of lubricant from the bearing is prevented by a pair of felt, lubricant-retaining rings 44, 45. The one ring 45 is arranged in an annular groove formed in the bore of the housing 38, while the other ring 44 is arranged in an annular groove formed in the bore of a metal placement ring 46 held in place in the housing 38 by a snap ring 47.

Threaded onto the rear end of the rock sleeve 36 is an adjusting collar 48 whose front end bears against the rear face of the inner race of the rear bearing 371. Longitudinally screwing this adjusting collar 48 in or out serves to simultaneously adjust the bearings 37, 371. When in proper position, said adjusting collar 48 is held in place by a securing ring 50 which bears against the rear face of the rock sleeve 36 and is adapted to draw the adjusting collar 48 firmly rearwardly toward it by the provision of three cap screws 51 which pass through said securing ring 50 and are threaded into the rear end of the adjusting collar 48. This securing ring has a forwardly projecting stud 52 which may be received within any one of a concentric, annular row of six holes 53 which are drilled longitudinally in the rear end of the rock sleeve 36. In using this bearing adjusting means, the adjusting collar 48 is first rotated to the desired position. Then the securing ring 50 is positioned so that the three holes for the cap screws 51 are in line with the three tapped holes in the rock sleeve 36. The securing ring is then turned counterclockwise (as seen in Fig. 6) until its stud 52 engages with the first encountered one of the holes 53. The adjusting collar 48 is then turned counterclockwise a sufficient distance to allow the cap screws 51 to be screwed into place.

To enable the felt, lubricant-retaining ring 441 to function properly over a long period of operating service, the periphery of the adjusting collar 48 must be absolutely concentric with the periphery of the inner race of the bearing 371. To effect this result, the rear end of said adjusting collar is bored smooth with a reduced diameter so as to directly ride upon the accurately machined cylindrical periphery of the rock sleeve, and thereby not ride upon the screw threads at the front end of the adjusting collar 48.

The rock sleeve 36 is of hollow form so as to receive within its bore the front end of the torsion rod 55 whose rear end is suitably secured to the frame of the car in any suitable manner, such as shown at 56 in Fig. 1. The extreme front end of said torsion rod is enlarged to provide an enlarged cylindrical portion 57 and, extending forwardly from the front end thereof, a tapered portion 60. The latter is provided with a keyway 61 which stops sufficiently far in front of the rear end of the cylindrical portion 57 to ensure that the maximum shear stress in said cylindrical portion is considerably less than the maximum shear stress in the main body of the torsion rod 55. Snugly disposed in this keyway 61 is a key 62 which serves to restrain rotation of the tapered portion 60 of the torsion rod relatively to a tapered ferrule 63 which is longitudinally clamped in position on said tapered portion 60 by a suitable nut 64. The rear end of said tapered ferrule 63 is annularly and coaxially rabbeted so as to be located in correct coaxial position on the front, annularly rabbeted end 59 of the rock sleeve. After said tapered ferrule 63 has been placed in proper position on the front end of said rock sleeve 36, it is secured thereto by a circumferential weld at 65. This construction has been found to be considerably less expensive than the customary flange and bolt construction.

When the vehicle is so long that there is no difficulty in finding adequate room for the most efficient length of torsion rod, the modified and less expensive construction shown in Fig. 9 may be advantageously employed. In this construction, the hub 363 of the rock lever 353, instead of being hollow and large enough in diameter to encircle the torsion rod as in Fig. 5, is hollow but of small diameter. The torsion rod 553 is headed to provide an enlarged cylindrical portion 573 and an internally tapered portion 603. The latter is pressed forwardly by a long tightening bolt 59 whose rear end is threaded into the front end of the torsion rod and whose front end is provided with a bolt head which bears against a thrust washer 69 located at the front end of the hub 363. The tapered portion 603 of said torsion rod receives the tapered rear end 633 of the hub 363 and may, if desired, be keyed by a key 623, though a key connection at this point is not absolutely necessary because of the extremely high frictional resistance to torsional movement of a tapered joint having such a slight taper as that illustrated. It will be noted that in this form of construction, the ferrule 63 of Fig. 5 has been eliminated and its place taken by the hollow, tapered form of the front end of the torsion rod itself.

Because of the small diameter of the hub 363, inexpensive needle bearings 66 may be advantageously employed to carry the radial load between said hub 363 and the semi-spherical bearing heads 67. The latter are suitably arranged within the semi-spherical bores 68 of the front and rear bearing housings 70, 701. This ball and socket construction permits the bearings to be disposed in proper alignment, when assembling the spring suspension, even though the housings 70, 701 have been more or less inaccurately secured in place, and even though the frame of the vehicle, after the latter is in service, is subjected to heavy twisting strains. Longitudinal thrust loads imposed upon the hub 363 are taken care of by a pair of suitable, tapered, roller, thrust bearings 71. In this construction the rock levers 353 are formed integrally with the hub 363.

Kick shackle

To prevent the gyroscopic forces in the front wheels from transferring their horizontal components to the frame of the vehicle, it is desirable, in certain types of installations, to use a kick shackle, whose function is to allow a limited amount of movement of the left end of the front axle A in a direction longitudinal of the vehicle. It is highly desirable that this kick shackle impose a geometrical resistance to longitudinal axle movement, i. e. that a small initial axle movement be resisted by substantially no resistance at all but that further axle movements be resisted by geometric and not arithmetic increases of resistance. It is also highly desirable to have no excessively high local pressures. It is further desirable that the kick shackle not require lubrication or other maintenance. These results are accomplished in the present invention as follows:

At the left end of the front axle A, are employed a pair of flexible kick shackles B, shown in Figs. 7 and 8, instead of the solid shackles 25 shown in Figs. 1, 2, 3 and 5. Each of these kick shackles comprises a pair of bundles of sheet metal laminations 74, said bundles being disposed vertically and parallel to each other in a common, vertical, transverse plane, and with each individual lamination disposed in a vertical transverse plane. These laminations 74 are preferably, though not necessarily, constructed of some resilient material such as heat treated, high carbon steel. This arrangement causes the axle pivot 212 to at all times remain parallel to the crank pin 322, but enables said axle pivot to move longitudinally with respect to said crank pin.

A symmetrical pair of controlling blocks 75 is vertically and transversely arranged at the upper end of each kick shackle link B against the longitudinal faces of the bundles of laminations 74. A similar, symmetrical pair of controlling blocks 75 is arranged at the lower end of each kick shackle. Said pairs of controlling blocks are suitably drilled to snugly embrace the axle pivot 212 and crank pin 322, and each controlling block is held at a properly spaced distance relatively to its companion controlling block by outer spacing ledges 76 and an inner spacing lug 77. Said blocks 75 are rigidly clamped to said axle pivot 212 and to said crank pin 322 in exactly the same fashion as the shackles 25 are rigidly clamped to the axle pivot 21 and crank pin 32, as previously described. Said outer spacing ledges 76 have the additional function of strengthening the connection between the controlling blocks 75 and the axle pivot 212 or crank pin 322 as the case may be and, in addition to this, the function of holding the bundles of laminations 74 in proper lateral alignment relatively to their companion controlling blocks. The outer end of each bundle of laminations 74 is connected to its companion controlling blocks 75 by a rivet 78 or by other suitable means.

Each controlling block 75 is so formed along its outer vertical edges as to provide a pair of parallel, curvilinear controlling faces 80. Each of said controlling faces 80 extends upwardly from the inner edge of its companion controlling block and terminates in a horizontal line which lies in a plane with the axis of the axle pivot 212 or crank pin 322 as the case may be. When the parts are in the position shown in the drawings, these curvilinear controlling faces 80 are in contact with the laminations 74 along the aforesaid horizontal line which lies in a plane with the axle pivot 212 or crank pin 322 as the case may be. This means that, in this position, the effective length of the laminations is equal to the distance between the axis of said axle pivot 212 and the axis of said crank pin 322. Therefore, in this position the resilient resistance of the laminations 74 to longitudinal movement of the crank pin 322, relatively to the axle pivot 212, is very small. Thus, when the parts are in the normal position shown in the drawings, the left end of the front axle A may move in a direction longitudinally of the vehicle with very little resistance offered by the laminations 74.

As soon as any movement of the left end of the front axle, longitudinally of the vehicle, occurs, the laminations 74 roll into contact with ever more inwardly disposed portions of the controlling faces 80. This reduces the effective length of said laminations and thereby prevents excessive local stresses and imposes a geometric rate of increasing resistance to longitudinal movement of the axle pivot 212. It is desirable to have a very definite limit of axle movement longitudinally of the vehicle, so as to be sure to not bind the various bearings of the spring suspension. It is also desirable to effect this result without depending on the resilient resistance of the laminations 74. This result is effected in the present invention by imposing the laminations 74 to a direct shear force whenever the axle pivot 212 moves longitudinally of the vehicle a sufficient distance to cause said laminations to be in contact with the extreme inner ends of the curvilinear controlling faces 80. It is to be noted in this connection, however, that the upper and lower pairs of controlling blocks 75 never quite come in contact with each other, as any such contact would impose excessive tensile strains on the laminations. However, said controlling blocks 75 do approach sufficiently close together to warrant the above statement that the laminations 74 are subjected to a purely shear stress and not to any bending stress, whenever the axle pivot 212 (at the left end of front axle A) moves longitudinally to the extreme limit of its movement.

In actual service, there is some possibility that stones and dirt may work their way into the space between the laminations 74 and the curvilinear controlling faces 80. In the present invention such foreign material is either crushed in place or is caused to become dislodged by the provision of a plurality of vent openings 81. The latter serve not only to vent foreign material, as just indicated, but also to reduce the area of contact between the laminations 74 and curvilinear controlling faces 80 and thus to increase the unit pressure imposed upon the foreign material and thereby enable the same to be crushed to a sufficiently small size to be vented. The possibility of any very large pieces of foreign material working into the space between the laminations 74 and the curvilinear controlling faces 80 is prevented by the fact that the upper and lower controlling blocks 75 are at all times in close proximity to each other and by the further fact that the vent openings are sufficiently small to prevent any large pieces of material working their way inwardly therethrough.

Rear end

In the vehicle disclosed in the herein drawings, the vehicle propelling engine is located at a considerable elevation at the rear end of the vehicle (left end of Figs. 3 and 1). Hence the rear-end component of the center of gravity is quite high above the surface of the road. It is highly desirable, under these circumstances, to have the axle pivot 214 also at a considerable distance above the surface of the road, as otherwise the foot pounds of side sway over the back axle would be considerably different from the foot pounds of side sway over the front axle, and heavy framewrack pressures would occur whenever the vehicle was moving and was deflected away from a straight line. It frequently occurs, at the same time, (as in the case of the passenger bus here illustrated) that positioning the torsion rods in line with the axle pivots 214 is quite out of the question, as torsion rods in such a location would very seriously interfere with the proper use of the vehicle. It is therefore highly desirable that the construction under such circumstances be such that low torsion rods can be employed in combination with high axle pivots. This is accomplished in the present invention as follows:

Disposed beneath the relatively low floor 82 of the vehicle are a pair of rear-end torsion rods 554 suitably anchored at their dead ends 564 to the front frame section 10 as shown in Fig. 1. The rear or live ends of each of these rear torsion rods 554 (see Fig 12) is formed in a manner similar to that of the live end of each front torsion rod 55, and is similarly secured to a torsion rod collar 83 which is provided with a laterally extending, annular flange 84 at its extreme rear end. Suitable cap screws 85 connect said flange with the annular flange 86 arranged at the fulcrum end of a bifurcated rock lever 87. The latter is held in coaxial alignment with respect to the collar 83 by an annular rabbet 88.

The bifurcated hub 90 of this rock lever 87 is journaled on needle bearings 91, 911 on the outer ends of a horizontal, longitudinal rock-lever pin 92. The latter is centrally secured by a retaining pin 93 to a bracket 94 which is secured by bolts 95, or otherwise, to the rear frame section 104 of the vehicle. To prevent the escape of lubricant from the rear needle bearing 911, the rear end of the rock lever hub 90 is provided with a welch plug 96 and a felt packing ring 971. Escape of lubricant from the front needle bearing 91 is prevented by a felt packing ring 97 and a disk 98 interposed between the hub 90 of the rock lever 87 and the rear end of the torsion rod collar 83 and backed by a resilient washer 99. It is important that this disk 98 be backed by said resilient washer 99 because, when the cap screws 85 are drawn up tight, the flanges 84 and 86 are brought into direct contact, and the cap screws 85 not subjected to bending strains in addition to shear strains, as they otherwise would be.

The two side arms of the bifurcated rock lever 87 are rigidly connected together by an integral, cross strut 100. The outer end also of said rock lever 87 is bifurcated (similarly to its bifurcated hub 90) and is provided with a wrist pin 101 which is pivotally connected to the lower end of a transfer link 102. The upper end of said transfer link is journaled by a needle bearing 103 on a tubular transfer pivot 104, the bore of which is tapped to receive a pair of clamping cap screws 105. The latter serve to firmly clamp the outer, bifurcated end of a hinge arm 106 against the opposite ends of said transfer pivot 104. Lubricant is prevented from escaping from the needle bearing 103 by a pair of felt washers 107 disposed at opposite ends of said needle bearing. The latter is held positively in a central position by a pair of sheet metal spacers 108.

The hinge arm 106 is integrally connected with a relatively long, horizontal, longitudinally disposed hinge sleeve 110 which is journaled on needle bearings 111, 1111 on a hinge pintle 112. Interposed between said bearings and said hinge pintle are a pair of hardened and ground, inner bearing races 113, 1131 which are held in properly spaced relation from each other by an enlarged intermediate portion of said hinge pintle. The opposite ends of said hinge pintle are firmly clamped to a pair of semi-spherical swivel heads 114, 1141, this clamping being effected by a pair of nuts 115 threaded onto opposite ends of the hinge pintle and operating to force the swivel heads 114, 1141 against the outer ends of the inner bearing races 113, 1131 and the latter, in turn, being forced against the enlarged central portion of the spindle. The semi-spherical swivel heads 114, 1141 are suitably mounted in a pair of semi-spherical, swivel head brackets 116, which are split in the usual and well known manner to receive their companion swivel heads, and are secured by bolts 109, 1094 or otherwise, to the rear frame section 104. This construction permits of rigidly supporting the hinge pintle 112 without any possibility of binding, even though the brackets 116 are located somewhat inaccurately on the frame. In addition to this, any wracking or twisting of the frame, after the vehicle is in service, is taken care of by said ball and socket construction of these swivel heads and brackets, thereby preventing binding of the roller bearings both during assembly and when in service.

It is desirable to be able to disassemble the various parts associated with the hinge sleeve 110 without disturbing the fastening between the brackets 116 and the vehicle frame. This result is obtained by boring out the rear swivel head 1141 to a sufficient diameter to allow the enlarged central part of the hinge pintle 112 to pass through. The space between the bore of said rear swivel head 1141 and the periphery of the reduced portion of the pintle is then filled in with a filler bushing 117.

Longitudinal thrust of the hinge sleeve 110 is taken care of by a pair of tapered roller, thrust bearings 118, 1181. The front thrust bearing 118 is situated intermediate of the rear face of the front swivel head 114 and a suitable shoulder, formed near the front end of the front, inner, needle-bearing race 113. The rear thrust bearing 1181 is situated intermediate of the front face of the rear swivel head 1141 and a suitable shoulder formed near the rear end of the rear, inner, needle-bearing race 1131. Adjustment of said thrust bearings is effected by a shim 120 of suitable thickness.

In actual practice it has been found commercially desirable, with small scale production, to have both swivel heads like the front one 114, and to have each swivel head carry the longitudinal thrust in one direction only.

The rear end of the hinge sleeve 110 is provided with an integral hinge arm 1061 which is symmetrically disposed with respect to the front hinge arm 106. Each of said hinge arms is connected at its outer end by a pair of needle bearings 121 with the outer ends of a crank pin 324 which is centrally pinned at 122 to the lower end of a companion shackle 254. The outer races of said needle bearings are received within the bores of a pair of adjustable caps 123 which are threaded into their companion hinge arms 106, 1061, concentrically with the crank pins 324. Disposed between the inner ends of each pair of adjustable caps 123 and the transverse, vertical outer faces of their companion shackle are a pair of conical thrust bearings 124. Adjustment of each of these thrust bearings is effected by screwing in or out its companion adjustable cap 123. Leakage of lubricant from each needle bearing 121 and its companion thrust bearing 124 is prevented by a felt packing ring 125 received within a suitable annular groove 126 formed in the adjacent, transverse vertical face of the shackle 254, disposed concentrically with respect to the crank pin 324.

In the hinge arm 106 (see Figs. 10 and 12) below its pair of adjusting caps 123 and above its pair of clamping cap screws 105 is formed a longitudinally disposed pair of slots 127 each of which is bounded laterally by a pair of clamping ears 128, 1282 through which passes a clamping bolt 130. The tightening of each clamping bolt 130 serves to clamp both its companion adjustable cap 123 and its companion clamping screw 105 to the hinge arm 106. This locks said cap and screw in position.

The upper ends of each pair of shackles 254 are clamped to opposite ends of a horizontal, longitudinally-disposed, rear axle pivot 214. The latter is journaled in a companion, rear-axle sleeve 204 in a manner substantially similar to the manner in which the front axle pivot 21 is journaled in the front axle sleeve 20. Each rear axle sleeve 204 is integrally formed at the upper end of an upstanding rear axle post 124 which is formed to provide a flat, vertical, longitudinal limiting face 131, and is secured by bolts 132 and 133 to its companion end of the rear axle 134.

In the particular construction here disclosed it was deemed desirable to definitely limit the lateral movement of the vehicle body relatively to the rear axle 134. This has been effected by arranging a rectangular, vertical pad of rubber 135 (or other soft material) in a suitable recess formed in each of the rear axle posts 124 in the flat limiting face 131 thereof. Each of said rubber pads 135 is adapted to come into substantially rolling contact with its companion hinge sleeve 110 when the vehicle body shifts laterally an excessive amount in the one or other direction. Under all normal operating conditions, however, these rubber pads 135 do not come into action; but they are useful under certain, very unusual conditions.

As has been discussed in greater detail in other of my patents and patent applications, the arrangement of the rock lever and its normal angularity and the length and angularity of the shackle are all variable elements which may be so changed as to get a great variety of spring characteristics, which may be graphically shown when the effective resilient resistance of the torsion rod is plotted against the displacement of either the one end or of both ends of the axle. The construction shown in Fig. 10 permits of still more variable elements, and an even greater variety of spring characteristics. This fact is illustrated diagrammatically in a somewhat exaggerated form in Fig. 11. One characteristic in particular shows distinctly in this diagram, namely, that the arrangement of the parts may be made such that when the axle pivot 215 has moved to the limit of its upward movement, the heavy strains which occur when the shackles 255 are in substantially a straight line with the rock lever 875 are carried directly from the hinge pintle 1125, while the torsion rod 555 and its bearings are only required to carry the torque load of the torsion rod and nothing more. This is a very important consideration because of the fact that it is the connection between the axle pivot 215 and hinge pintle 1125 which must carry both the horizontal thrust loads and the brake torque loads, and hence must be sufficiently strong to carry these loads and, therefore is, as a consequence, strong enough to take the maximum vertical loads in the manner indicated in Fig. 11.

Adjustable caster axle

In Figs. 14 and 15 is shown a front axle, similar to the axle of Figs. 2 and 1, but incorporating a provision for adjusting the caster of the front wheels, i. e., the angle of each front wheel spindle 18 as measured in a longitudinal plane intersecting the axis of said spindle. In this construction, the two piece axle post 136, 137 connects the axle pivot 216 with the axle bar 116, the latter, in this case being shown of tubular form welded to the lower axle post section 137 at 156. The meeting faces of the upper and lower axle post sections 136, 137 are of flat form, and have interposed between them a caster-adjusting wedge 138 whose longitudinally rear end (as seen in Fig. 15) is of different thickness from the thickness at its front end. The two post sections 136, 137 and the intervening wedge 138 are clamped together by clamping bolts 140, 141. When it is desired to change the caster of the front wheels in either a positive or negative direction, these bolts 140, 141 are removed, a different wedge 138 inserted, and said bolts 140, 141 again tightened up. On ordinary production jobs, such a means of adjusting the front wheel caster is not considered necessary when the herein disclosed type of spring suspension is employed, because in this type of spring suspension, the caster of the front wheels is unchangeable, irrespective of what happens to the means which resiliently support the vehicle, consisting, in this case, of the torsion rods 55, 554. This is in sharp contrast to ordinary leaf spring constructions, in which the front wheel caster is constantly changing, both as a consequence of axle movement and of change of shape of one or more of the leaf springs.

Oblique torsion rods

In certain vehicle constructions it is difficult to arrange one or more of the pairs of torsion rods in such a way as to be parallel to each other in the manner shown in Figs. 1–15. One method of arranging oblique torsion rods has been shown in my co-pending patent application for a Vehicle spring suspension Ser. No. 713,161 in which a universal joint was employed. Such a universal joint may be quite desirable when the torsion rods are disposed at a large angle to each other, but it is now known, from actual practice, that no universal joint is necessary when this angle is not excessively large. The present invention discloses a means whereby a pair of torsion rods may be disposed at a relatively small angle to each other without involving any frictional loss from a universal joint or its equivalent and, at the same time, without any undesirable warping of bearings or other deleterious reactions.

In Fig. 16 is shown a torsion rod 557 arranged at the left front end of a vehicle and disposed obliquely with reference to the longitudinal axis of the vehicle. Said torsion rod may, if desired, be disposed in a plane which is not horizontal, but it is preferred that it be disposed in a horizontal plane. Said torsion rod is provided with a pair of rock levers 357 at the outer end of which is journaled a crank pin 327, in a manner similar to that shown in Fig. 5. The axis of said crank pin is preferably parallel to the axis of the torsion rod 557, as shown, but such a parallel arrangement is not essential in the present invention.

Secured to opposite ends of said crank pin 327, by means of a pair of Woodruff keys 142, 1421 and a crank pin nut 267, or by other suitable means, is a pair of torque, kick shackles B7. The latter are suitably secured at their upper ends to opposite ends of an axle pivot pin 217 which is preferably normally parallel to the torsion rod 557, as shown. This axle pivot pin 217 is journaled in the upper end of an axle post 127, which is secured to an adjacent end of the front axle 117, in a manner similar to that shown in Figs. 5 and 2.

As the left end of said front axle 117 moves back and forth in accordance with its "kick" action, the torque kick shackles B7 flex longitudinally in a manner similar to that of the action of the kick shackles B of Fig. 7. This action allows the axle pivot pin 217 to move longitudinally with reference to the crank arm pin 327. In addition to this movement said axle pivot pin and crank arm pin are caused to move obliquely with reference to each other because of the oblique position of the torsion rod 557. This combined flexing and twisting of the shackles B7 is taken care of as follows:

The main body of each shackle B7 consists of a bundle of resilient metal laminations 747 which are suitably bored at their upper and lower ends to receive the axle pivot pin 217 and the crank arm pin 327 respectively, and are suitably slotted to engage with the Woodruff keys 142, 1421. It is very important, as concerns such very vital parts as these shackles, that the metal be not overstressed at any one local point. Any such localized overstressing is prevented in the present invention by the use of a pair of symmetrical controlling blocks 757 at the upper and lower ends of each shackle. Each controlling block has a simple curved controlling surface 807 as best shown in Figs. 23 and 17. This controlling surface allows the laminations 747 to flex longitudinally so as to take care of the "kick" action of the axle, and, at the same time, allows the shackle to be twisted to a sufficient degree to take care of oblique movements of the axle pivot pin and crank arm pin relatively to each other. The shape of the controlling surfaces 807 is so designed that in no position which the various parts may assume does any portion of any one of the laminations 747 become stressed above a definite fatigue stress limit. At the same time, these controlling surfaces 807 serve to cause said laminations to provide a geometric rate of resistance to flexure.

Each controlling block 757 is provided with a pair of rectangular vent openings 818, so that any hard particles which may become lodged between the laminations 747 and the controlling blocks 757 will be crushed and then vented out of said vent openings.

It is not ordinarily desirable to have a "kick" shackle at the right end of the front axle. But, where the front torsion rods of the vehicle are arranged at an angle to the longitudinal axis of the vehicle, as indicated in Fig. 16, it is necessary to provide some means of taking care of this obliquity by some sort of connection which will enable a twisting action to occur but will not allow the axle to move longitudinally beyond the small amount of longitudinal movement incidentally due to the obliquity itself. In Figs. 21, 22 and 24 is shown a plain torque shackle B8 which accomplishes these results. The laminations 748 of this type of shackle are identical with the laminations 747 of Figs. 16-20 except that the controlling blocks 758 have the form shown in Fig. 24 instead of that shown in Fig. 23. The medial, vertical portion of each of the controlling blocks 758 is straight, as indicated at 143, while the adjacent corners of said block are of curvilinear shape as shown at 144 and 1441. This construction prevents the axle pivot pin 217 from moving longitudinally with respect to the crank arm pin 327, but permits said pins to move obliquely relatively to each other. When such an oblique movement occurs, both of said pins are slightly twisted and it is therefor necessary in designing this part of the spring suspension to provide pins of such dimension and constructed of such material that this twisting can occur without stressing any of the metal beyond the safe fatigue limit. Actual practice has demonstrated that such a twisting action does not interfere with the free action of any of the various anti-friction bearings.

I claim as my invention:

1. A vehicle spring suspension connecting the frame and axle of a vehicle and comprising: bearings on said frame; a rock sleeve pivoted at its opposite ends on said frame in said bearings; a rock lever secured to said sleeve intermediate the bearings thereof and having a crank pin; resilient means for restraining rotation of said rock sleeve; an axle pivot connected with the axle; and a shackle pivoted at its opposite ends to said axle pivot and said crank pin.

2. A vehicle spring suspension connecting the frame and axle of a vehicle and comprising: bearings on said frame; a rock sleeve pivoted at its opposite ends on said frame in said bearings; a pair of rock levers secured to said sleeve intermediate the bearings thereof and having a crank pin; resilient means for restraining rotation of said rock sleeve; an axle pivot connected with the axle; and a shackle pivoted at its opposite ends to said axle pivot and said crank pin.

3. A vehicle spring suspension connecting the frame and axle of a vehicle and comprising: bearings on said frame; a rock sleeve pivoted at its opposite ends on said frame in said bearings; a rock lever welded to said sleeve intermediate the bearings thereof and having a crank pin; resilient means for restraining rotation of said rock sleeve; an axle pivot connected with the axle; and a shackle pivoted at its opposite ends to said axle pivot and said crank pin.

4. A vehicle spring suspension connecting the frame and axle of a vehicle and comprising: a tubular rock sleeve pivoted at its opposite ends on said frame; a torsion rod received within said sleeve and having its dead end connected with the vehicle frame; a ferrule connected with the live end of said torsion rod and secured by welding to the front end of said rock sleeve; a rock lever secured to said sleeve and having a crank pin; and means connecting said crank pin with the axle.

5. A vehicle spring suspension connecting the frame and axle of a vehicle and comprising: a frame and axle of a vehicle and comprising: a tubular rock sleeve pivoted at its opposite ends on said frame; a torsion rod received within said sleeve and having an enlarged head at its live end and having its dead end connected with the vehicle frame, a ferrule connected with said enlarged head of said torsion rod and secured by welding to the front end of said rock sleeve; a rock lever secured to said sleeve and having a crank pin; and means connecting said crank pin with the axle.

6. A vehicle spring suspension connecting the frame and axle of a vehicle and, comprising: a tubular rock sleeve pivoted at its opposite ends on said frame; a torsion rod received within said sleeve and having an enlarged head at its live end consisting of a tapered portion at its extreme front end and a cylindrical portion disposed inwardly of said tapered portion; means connecting the dead end of the torsion rod with the frame; a ferrule connected with only the tapered portion of said torsion rod and secured to the front end of said rock sleeve; a rock lever secured to said sleeve and having a crank pin; and means connecting said crank pin with the axle.

7. A vehicle spring suspension connecting the frame and axle of a vehicle and comprising: a rock lever longitudinally pivoted on said frame and having a crank pin sleeve; means for resiliently restraining rotation of said rock lever; a crank pin journaled in said crank pin sleeve and rigidly connected at its opposite ends to the lower ends of a pair of shackles; and an axle having an axle pivot which is journaled in the upper ends of said shackles.

8. A vehicle spring suspension connecting the frame and axle of a vehicle and comprising: a rock lever longitudinally pivoted on said frame and having a crank pin sleeve; means for resiliently restraining rotation of said rock lever; a crank pin journaled in said crank pin sleeve and rigidly connected at its opposite ends to the lower ends of a pair of shackles; and an axle pivot which is rigidly connected to the upper ends of said shackles and is journaled on said axle.

9. A vehicle spring suspension connecting the frame and axle of a vehicle and comprising: a rock lever pivoted on said frame and having a crank pin sleeve; a crank pin arranged concentrically within said sleeve; a pair of bearing races arranged on said pin and separated by a spacing collar; bearings disposed between said races and said sleeve; shackles rigidly clamped at their lower ends against the outer ends of said races; a thrust adjusting means disposed intermediate of the one outer end of said sleeve and the inner face of an adjacent shackle; and an axle having an axle pivot which is journaled in the upper ends of said shackles.

10. A vehicle spring suspension connecting the frame and axle of a vehicle and comprising: bearings mounted on said frame in spaced relation; a rock sleeve pivoted at its opposite ends in said bearings; a rock lever secured to said sleeve and having a crank pin; resilient means for restraining movement of said axle; an axle pivot connected with the axle and a shackle pivoted at its opposite ends to said axle pivot and said crank pin.

11. A vehicle spring suspension for connecting the frame and axle of a vehicle and comprising: a tubular rock sleeve pivoted at its opposite ends on said frame; a torsion rod arranged longitudinally of said frame and anchored at one of its ends to said frame and having its opposite end connected to said sleeve; a rock lever secured to said sleeve; a crank pin on said rock lever and a link pivoted at its upper end on said axle and at its lower end on said crank pin.

12. A vehicle spring suspension for connecting the frame and axle of a vehicle and comprising: a tubular rock sleeve pivoted at its opposite ends on said frame; a torsion rod arranged longitudinally of said frame and anchored at one of its ends to said frame and having its opposite end received within and connected to the far end of said sleeve; a rock lever secured to said sleeve; a crank pin on said rock lever and a link pivoted at its upper end on said axle and at its lower end on said crank pin and extending upwardly and inwardly from said crank pin.

ALBERT F. HICKMAN.